Nov. 10, 1959     L. W. HAERTHER ET AL     2,912,192
TORQUE OPERATED VARIABLE REFERENCE SWITCH
FOR DISABLING THE ALTITUDE
CONTROLLER OF AN AIRCRAFT
Filed July 31, 1958
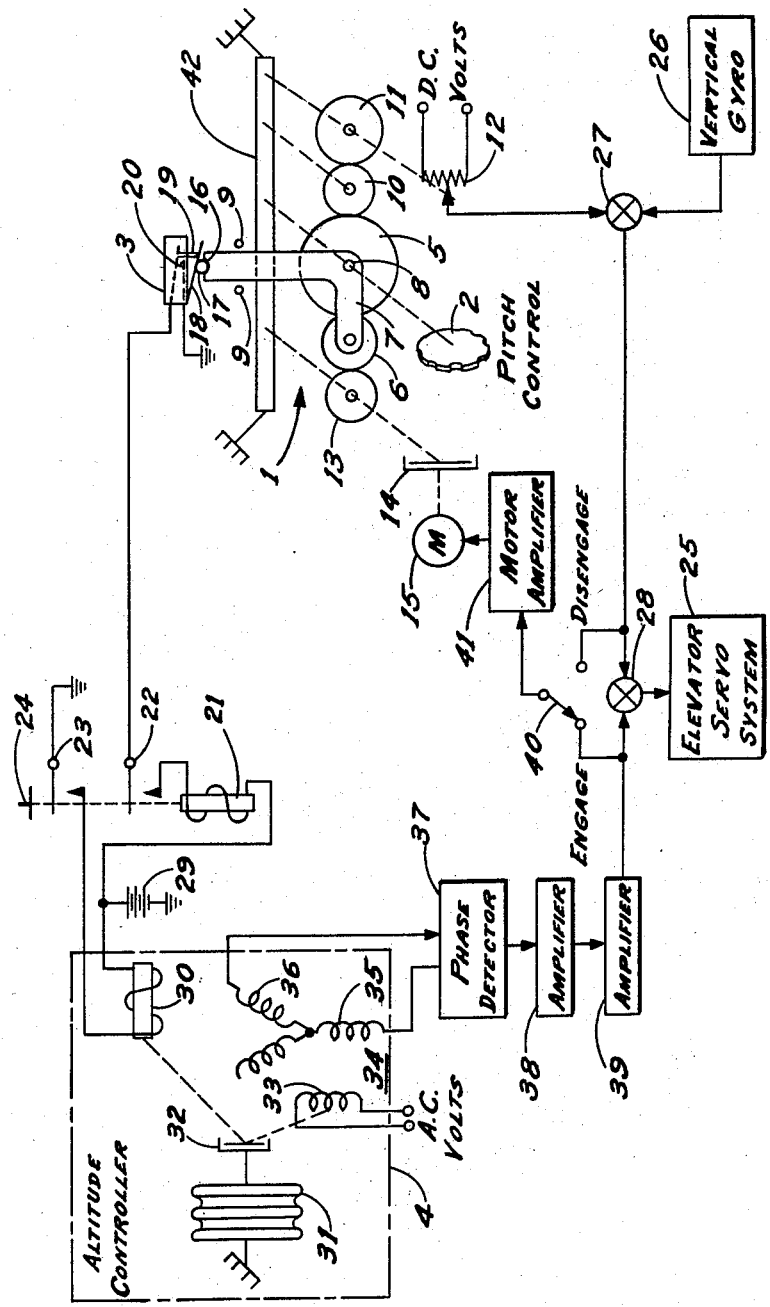
INVENTORS
LESTER W. HAERTHER
LEO P. KAMMERER
BY
ATTORNEY
AGENT

United States Patent Office 2,912,192
Patented Nov. 10, 1959

2,912,192

TORQUE OPERATED VARIABLE REFERENCE SWITCH FOR DISABLING THE ALTITUDE CONTROLLER OF AN AIRCRAFT

Lester W. Haerther and Leo P. Kammerer, Cedar Rapids, Iowa., assignors to Collins Radio Company, Cedar Rapids, Iowa, a corporation of Iowa Application July 31, 1958, Serial No. 752,317

3 Claims. (Cl. 244—76)

This invention relates to automatic pilot systems for aircraft and particularly pertains to switch actuators for disabling automatic altitude controllers in response to operation of manual pitch controls.

Commonly in an aircraft that is equipped with an automatic pilot, the pilot may select three different modes of operation which require three different controls for operating the elevators of the aircraft. This description does not include still another mode of flight that is used with automatic landing facilities. Each different mode of control requires that a different circuit arrangement be selected in the automatic pilot system by an electrical or a mechanical mechanism. These different modes of control include the usual manual control. During manual control of the aircraft, the automatic pilot is disengaged so that it does not contribute toward control of the aircraft. When the automatic pilot is engaged for controlling flight of the aircraft, the position of the elevators may be controlled firstly, manually through operation of a pitch control or secondly, automatically through operation of an altitude controller. Operation of the manual pitch control is effective in changing the attitude of the aircraft as required for changing altitude. When a desired altitude has been attained, the altitude controller, which is usually a barometric device, may be enabled. When in operation, the controller is effective in changing pitch to the degree required for maintaining the altitude of the aircraft at approximately the desired altitude regardless of varying air currents or changing distribution of load.

When the control of the elevators is to be transferred from the automatic altitude controller to the manual pitch control, the transfer must for convenience and safety be automatic in response to a manual change in pitch control. Accordingly, this invention comprises a limited epicyclic gear drive and switching system for coupling both a motor and a manual pitch control to an input of an elevator servo system and also for coupling said manual pitch control to a release circuit for disabling an altitude controller, said epicyclic gear system having a sun gear that is in mesh with a planetary gear, said planetary gear being mounted on a rotatable planetary gear carrier arm, said manual pitch control being operable for changing said elevator input control and for rotating said gear carrier arm over a limited arc, said release circuit responding to rotation of said gear carrier arm to disable said altitude controller, and said motor being coupled through said planetary gear and said sun gear to said elevator input control.

An object of this invention is to provide a simple coupling arrangement responsive to operation of the pitch control for disabling an altitude controller. The following description and the appended claims may be more readily understood with reference to the accompanying single figure which is a schematic diagram of the epicyclic gear system and switch actuator of this invention in combination with a usual altitude controller and elevator servo positioning system.

With reference to the accompanying figure, the epicyclic gear system 1 operates in response to the change of pitch control 2 to actuate switch 3. The altitude controller 4 is disabled in response to the actuation of switch 3 so that the controller is no longer responsive for determining positions of elevators.

More particularly, the epicyclic gear system comprises a sun gear 5, a planetary gear 6, a stationary gear mounting plate 42, and a planetary gear carrier arm 7 which is rotatable about the axis of the sun gear. The gear carrier arm 7 engages the actuator of switch 3, and is rotatably mounted to the same shaft 8 to which pitch control knob 2 and sun gear 5 are secured. The movement of carrier arm 7 is limited to a small degree of rotation about shaft 8 by stop pins 9. The sun gear 5 is in mesh with idler gear 10, and this gear is coupled through gear 11 to the arm of potentiometer 12. The position of the arm of potentiometer 12 determines the pitch of the aircraft while the automatic pilot is engaged. The sun gear is also in mesh with planetary gear 6 that is in mesh with driving gear 13. Gear 13 is coupled through slip clutch 14 to pitch control motor 15.

The outer end of an extended portion of gear carrier arm 7 has a concave surface 16 for receiving a spherical member 17 which is fixed to spring arm 18 of switch 3. Spring arm 18 constantly urges member 17 against the concave surface 16 to provide a detent that maintains carrier arm 7 at a normal position midway between the two stops 9. Manual rotation of pitch control knob 2 produces sufficient torque on carrier arm 7 as described hereinafter to actuate arm 18 and contact follower 19 of switch 3 for opening contacts 20.

The relay 21 has normally open contacts 22 and 23, and is operative for enabling altitude controller 4. These contacts are closed momentarily by operation of push button 24 and are maintained closed through energization of the winding of relay 21 while switch 3 is released. Current for maintaining relay 21 in an operated condition flows from source of voltage 29, through winding of relay 21, contacts 22, contacts 20 of switch 3 and through a ground connection back to the source of voltage 29. The relay is, therefore, maintained operated until switch 3 is actuated for opening contacts 20. Solenoid actuator 30 of altitude controller 4 is energized by a circuit that extends from a source of direct-current voltage 29 through the winding of solenoid 30 and contacts 23 of relay 21.

The altitude controller is of the type that has a barometric bellows 31 connected through clutch 32 to the rotary primary winding 33 of synchro transformer 34. When the clutch 32 is engaged, change in atmospheric pressure moves the diaphragm of bellows 31 to cause rotation of winding 33. When winding 33 is rotated off its normal or null position, voltage is induced into secondary windings 35 and 36 and is applied to phase detecting and amplifying circuits that are connected to the input of elevator servo system 25.

In operation, the pitch control system responds in a conventional manner to change the attitude of the aircraft when pitch control 2 is rotated. In response to the rotation of pitch control 2, the arm of potentiometer 12 is rotated through operation of the train of gears that includes sun gear 5, idler gear 10, and gear 11. The position of the arm of potentiometer 12, which is connected to a source of direct-current voltage, determines a voltage corresponding to the pitch that an associated aircraft is to attain. This control voltage and voltage derived from vertical gyro 26 is applied to mixer 27 for developing a differential control voltage which is applied through mixer 28 to elevator servo system 25. As the pitch of the aircraft is changing in response to the application of voltage to the servo system, the value of the voltage developed by vertical gyro 26 becomes equal to that applied by potentiometer 12 so that the differential voltage developed in mixer 27 approaches zero. When the differential voltage becomes zero, the elevators of the aircraft trail, and the aircraft continues to fly in the attitude that is dependent upon the voltage that is being applied from potentiometer 12. The operation of the electrical circuits in this pitch control system is similar to the operation in prior systems.

When a desired altitude has been attained, push button 24 is pressed to enable altitude controller 4. Operation of the push button closes locking contacts 22 for maintaining relay 21 operable and closes contacts 23 for enabling the altitude controller. When the altitude of the aircraft changes so that it is no longer at the same altitude as when push button 24 was pressed, voltage is generated across windings 35 and 36 for application to phase detector 37. From the output of a phase detector, direct-current voltage that is proportional to the deviation from the desired altitude is applied through amplifiers 38 and 39 to mixer 28. Voltage from the vertical gyro 26 is also applied to mixer 28 so that a difference voltage from the output of the mixer is applied to the elevator control 25. When the voltage that is applied to mixer 28 from vertical gyro 26 is equal to that applied from amplifier 39, the aircraft tends to fly either at the desired altitude or at a constant distance above or below the desired altitude.

However, if the aircraft is not flying at the desired altitude, voltage from the output of amplifier 39 will be applied through contacts of switch 40, which is in position Engage, for applying a voltage to motor amplifier 41. In response to the application of voltage to motor amplifier 41, motor 15 operates through slip clutch 14, drive gear 13, planetary gear 6, and sun gear 5 for rotating pitch control 2 which is coupled to pitch control potentiometer 12.

Since potentiometer 12 is driven very slowly, it operates as an integrator which does not respond effectively to voltage changes of short duration that are applied from altitude controller 34 to compensate for small fleeting departures from the desired altitude. However, as long as there is a voltage applied to motor 15 in response to a persistent voltage being developed in output circuit of controller 4, the position of potentiometer 12 will be constantly changing for applying a voltage of proper polarity to elevator control 25, therefore, for changing the attitude of the aicraft as required so that it will approach the desired altitude.

Only as the aircraft approaches and attains the desired altitude will the voltages that are developed in the output circuit of altitude controller 4 and in the output of mixer 27 become zero. Obviously, according to principles well known in the art, motor 15 ceases operation in response to the output of altitude controller 4 becoming zero. The aircraft then continues to fly at the desired altitude in response to the application of momentary voltages from the altitude controller to the elevator servo system.

When it is desired to change the course of flight from the constant altitude which is being determined by the altitude controller, it is only necessary to change the position of pitch control 2 for simultaneously changing the position of the arm of potentiometer 12 and for disabling the altitude controller. As pitch control 2 is being rotated for operating potentiometer 12 through sun gear 5 and planetary gear 6, the driven gear 13 which is in mesh with gear 6, presents a substantial load to the gear system. Gear 13 resists rotation because of the opposition due to friction in the slip clutch 14, motor 15, and its associated gear system. The torque that can be applied before slippage occurs at clutch 14 to the planetary gear carrier arm 7 by the force exerted between the planetary gear 6 and motor drive gear 13 is sufficient to overcome the force provided by the detent which includes the spring loaded element 17. Therefore, the gear carrier arm rotates about the shaft 8 in a direction corresponding to the direction of rotation of pitch control knob 2 until the gear carrier arm is positioned against one of the stops 9.

While the plate is held against one of the stops, contacts 20 of switch 3 are forced open in response to spherical element 17 of arm 18 being displaced from the center of concave surface 16. The circuit for energizing relay 21 is now open at contacts 20 and the relay releases to open contacts 23. The solenoid 30 of control 4 is, therefore, de-energized to disengage clutch 32 so that the primary winding 33 of synchro transformer 34 is returned to its normal position. In this position the output voltage from the altitude controller is zero so that it has no controlling action on the elevators of the aircraft. Although the rotation of gear carrier arm 7 tends to disengage planetary gear 6 from driving gear 13, the amount of rotation of the arm is limited to such a small arc by stops 9 that gear 6 is always substantially in mesh with gear 13. Obviously after gear plate 7 contacts one of the stops 9, slip clutch 14 will slip in order to permit any required amount of rotation for setting potentiometer 12.

When the automatic pilot system is disengaged, disabling circuits (not shown) prevent the elevator control system from operating the elevators of the aircraft. However, the gear system shown herein is still employed in order that the position of potentiometer 12 will always correspond to the actual pitch of the aircraft at all times. It is necessary that the setting of potentiometer 12 follow the pitch of the aircraft in order that control of the aircraft may be transferred from manual operation to automatic operation at any instant without abruptly changing its course. Therefore, while switch 40 is in position Disengage, differential voltage for mixer 27 is applied directly to motor amplifier 41 for operating motor 15 that is coupled through the differential system 1 to potentiometer 12. The motor will operate as necessary to position the arm of potentiometer 12 as required to develop a voltage that corresponds to that developed by vertical gyro 26 and, therefore, corresponds to the pitch of the aircraft. While the epicyclic gear system 1 is being operated by motor 15 rather than by pitch control 2, there is sufficient torque offered by detent mechanism associated with switch 3 to maintain switch plate 7 in a normal position about midway between stop pins 9.

Obviously other commonly known signal developing devices may be substituted for potentiometer 12 or a different type of altitude controller may be substituted for controller 4. Although this invention has been described with respect to a particular embodiment shown in the accompanying drawing, the epicyclic gear drive and switching system as associated with an altitude controller release circuit may be modified in ways that are obvious to those who are skilled in the art for application to various automatic pilot systems and still be within the spirit and scope of the following claims.

What is claimed is:

1. In an automatic pilot system having first and second signal developing devices that are operable to different positions for changing positions of control surfaces of an aircraft, first and second control means for operating said first and second signal developing devices respectively to different positions, said second signal developing device normally being disabled, means for enabling said second signal developing device to change the positions of said control surfaces; a limited epicyclic gear system, said epicyclic gear system having first and second mounting plates, a sun gear and a planetary gear, said sun gear and said first mounting plate being coaxially and rotatably mounted to said second mounting plate, said planetary gear being rotatably mounted to said first mounting plate, a third gear rotatably mounted to said second mounting plate, said planetary gear being in mesh with said third gear and with said sun gear, detent means for constantly yielding a force to maintain said first mounting plate in a normal position, stop means for limiting rotation of said first mounting plate in either direction from said normal position so that said planetary gear is always substantially in mesh with said third gear, said first control means being drivingly coupled to said sun gear and also to said first signal developing device, said planetary gear in response to operation of said first control means applying to said first mounting plate torque that is caused by the force existing between said third gear and said planetary gear, said third gear being loaded so that said torque applied to said first mounting plate being greater than that applied thereto by said detent means causes rotation of said first plate off said normal position during operation of said first signal developing device to a different position, and disabling means responsive to rotation of said first plate off said normal position for disabling said second signal developing device.

2. In an automatic pilot system having an elevator servo control system for positioning elevators in an aircraft, an automatic altitude control channel and a manual pitch control channel connected to the input of said servo control system, a pitch-signal developing device connected to said pitch control channel for determining a pitch signal, and a manual pitch control for adjusting said device; switching means connected to said automatic altitude control channel, said switching means having a released position for allowing operation of said automatic altitude control channel and having an operated position for disabling said automatic altitude control channel, a limited epicyclic gear system for coupling said manual pitch control to said pitch control channel and also for operating said switching means, said epicyclic gear system comprising first and second mounting plates, a sun gear, and a planetary gear, said planetary gear being rotatably mounted on said first mounting plate, said first mounting plate and said sun gear being rotatable and coaxially mounted to said second gear plate, means for operatively coupling said pitch signaling device to said sun gear, means for drivingly coupling said manual pitch control to said sun gear, a third gear coupled to said planetary gear, said third gear offering substantial resistance against rotation, limiting means, said first mounting plate being rotatable about the axis of said sun gear within limits defined by said limiting means, and said first plate being rotatable in response to the rotation of said manual pitch control for operating said switching means.

3. In an automatic pilot system having an elevator servo control system for positioning elevators in an aircraft, first and second pitch control channels connected to the input of said elevator servo control system, said channels being operative for changing the position of said elevators, said first pitch control channel having a first pitch signal developing device, a manual pitch control for operating said first pitch signal developing device, said second pitch control channel having a second pitch signal developing device, altitude determining means responsive to changes in altitude for operating said second pitch signal developing device, enabling means for successively coupling and uncoupling said altitude determining means from said second pitch signal developing device; a relay, said relay having an operating winding, holding contacts, and control contacts, means for manually closing said contacts, said enabling means responding to the closing of said control contacts of said relay for operatively coupling said altitude determining means to said second pitch signal developing device, a switch having normally closed contacts, an electrical circuit including said winding, said holding contacts and said normally closed contacts of said switch for energizing said winding, said contacts of said relay being maintained closed in response to the energization of said winding, a limited epicyclic gear system having first and second mounting plates, a sun gear and a planetary gear, said planetary gear being rotatably mounted on said first mounting plate, said sun gear and said first mounting plate being rotatably and coaxially mounted to said second mounting plate, said planetary gear being in mesh with said sun gear, said manual pitch control being coupled to said sun gear, means for coupling said first pitch signal developing device through said sun gear to said manual pitch control, a motor, a motor drive gear, said motor drive gear being in mesh with said planetary gear, a slip clutch, said motor being coupled through said slip clutch to said motor drive gear, means for coupling the output of said second pitch control channel to the input of said motor, said motor gear offering substantial resistance against rotation in response to operation of said manual pitch control, limiting means, said mounting plate being rotatable about the axis of said sun gear within limits as defined by said limiting means, and said first plate being rotatable in response to the rotation of said manual pitch control for operating said switch.

No references cited.